United States Patent [19]

Yoshikawa et al.

[11] Patent Number: 5,497,937
[45] Date of Patent: * Mar. 12, 1996

[54] METHOD FOR BONDING A MEMBER HAVING METAL

[75] Inventors: Yoshio Yoshikawa; Yoshiaki Inoue; Isamu Yoshino; Teruo Takeuchi, all of Tokyo, Japan

[73] Assignee: Mitsubishi Gas Chemical Company, Inc., Tokyo, Japan

[*] Notice: The portion of the term of this patent subsequent to Apr. 26, 2011, has been disclaimed.

[21] Appl. No.: 297,519

[22] Filed: Aug. 26, 1994

[30] Foreign Application Priority Data

Aug. 30, 1993 [JP] Japan .................................. 5-214033
Sep. 17, 1993 [JP] Japan .................................. 5-231739

[51] Int. Cl.⁶ .............................. B23K 1/00; C23F 11/00
[52] U.S. Cl. ........................... 228/205; 228/207; 29/841; 148/25
[58] Field of Search ........................ 228/205, 207, 228/217, 203, 214, 223; 29/841, 855; 148/25

[56] References Cited

U.S. PATENT DOCUMENTS

| | | | |
|---|---|---|---|
| 4,908,151 | 3/1990 | Inoue et al. | 252/188 |
| 4,921,157 | 5/1990 | Dishon et al. | 228/124 |
| 5,286,407 | 2/1994 | Inoue et al. | 252/188.28 |
| 5,305,948 | 4/1994 | Yoshikawa et al. | 228/205 |
| 5,378,428 | 1/1995 | Inoue et al. | 422/9 |

FOREIGN PATENT DOCUMENTS

| | | |
|---|---|---|
| 0155139 | 9/1985 | European Pat. Off. . |
| 0269410 | 6/1988 | European Pat. Off. . |
| 0454437 | 10/1991 | European Pat. Off. . |
| 0574161 | 12/1993 | European Pat. Off. . |
| 3161191 | 7/1991 | Japan . |

OTHER PUBLICATIONS

Patent Abstracts of Japan, publication No. JP1067252, pub. date Mar. 13, 1989.
Patent Abstracts of Japan, publication No. JP63198962, pub. date Aug. 17, 1988.
Patent Abstract of Japan, publication No. JP62101372, pub. date May 11, 1987.

*Primary Examiner*—Samuel M. Heinrich
*Attorney, Agent, or Firm*—Leydig, Voit & Mayer

[57] ABSTRACT

A flux-free method for bonding a member which is at least partially metallic to another member is provided including preserving the at least partially metallic member in a container having a low gas permeability, together with a packet containing a rust-proof composition; and bonding the at least partially metallic member with the other member by using a filler material.

29 Claims, 2 Drawing Sheets

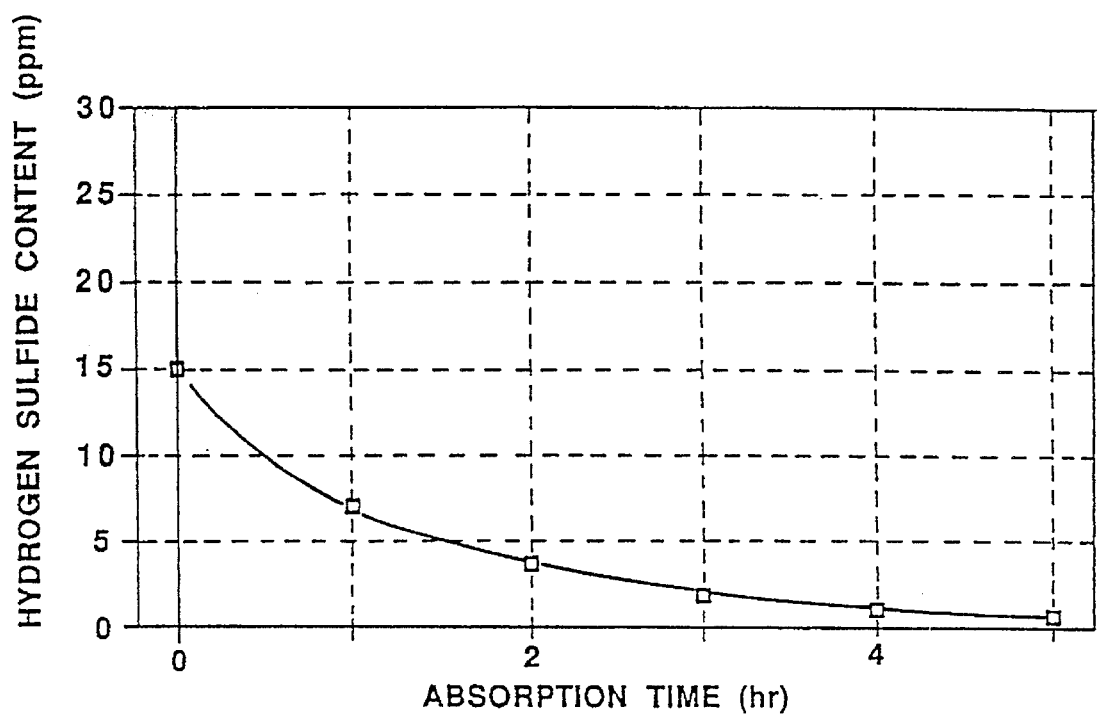

METHOD FOR BONDING A MEMBER HAVING METAL

BACKGROUND OF THE INVENTION

The present invention relates to a method for bonding a member having metal with another member having metal or another metal material by using a filler material, without using a flux.

More specifically, this invention relates to a method for preventing the metal from being oxidized during the preservation of the member having metal, and making the bonding of the member having metal to the other member by using a filler material possible, without using a flux.

In more detail, this invention relates to a method for bonding electronic parts, which is appropriate for the bonding of electronic parts by using a filler material, and which is to be applied when mounting an electronic part on a substrate.

When a member including metal, such as various kinds of electronic parts, is exposed to air during preservation or transportation, the metal portion is easily oxidized, and the metal surface will be covered with an oxide layer. Once the oxide layer is formed in this way, it becomes difficult to bond the metal portion of this member to the other metal material or other member having metal by soldering or brazing.

Accordingly, a postflux has been used to remove the oxide layer on the metal surface. This postflux is a compound containing a halogen activator, and is an agent which is capable of removing the oxide layer on the metal surface when it is applied to the member to be bonded by a filler material.

However, there are some defects in the application of a postflux to electronic parts, such as the corrosion of the metal portion due to halogen compounds which remain on the metal portion of the electronic parts, and the deterioration of electrical insulation of the electronic parts.

Therefore, it has been necessary to clean the electronic parts with a solution containing an organic halogen based solvent, such as freon, or a surface active agent.

However, the technology of cleaning electronic parts also has the following defects:

First, halogen based solvents such as freon compounds including trichlorofluoromethane, trihaloethane and trihalomethan have a problem that they may destroy an ozone layer of the earth. The manufacture and use of these halogen based solvents is limited or is going to be limited by international treaties.

Secondly, when cleaning electronic parts with a solution containing a surface active agent, the waste water containing heavy metals and organic substances must be treated. It is also necessary to dry the electronic parts, thereby increasing costs.

Based on the above-described background, a flux containing a small amount of halogen has been suggested. For example, in the Japanese Patent Laid-Open (Kokai) Publication No. 1991-161191, a flux containing organic solvents, polyhydric alcohol, organic acids, and organic halogen activators, with the intention of decreasing the content of the halogen activators, is described. By using this flux, it is possible to restrict the amount of the remaining halogen, after bonding with a filler material, to 14 $\mu g/inch^2$ or less, and thus to omit the cleaning of the electronic parts after bonding with a filler material.

Further, there is a description in the MIL standard about a flux called R type which does not contain halogen activators and which consists essentially of an alcohol solution of rosin.

However, this type of flux has the following problems:

First of all, by using the R type flux, the flux may penetrate into the electronic parts and may hinder the electrical characteristics of the electronic parts.

There are other problems concerning both the flux containing a small amount of halogen and the R type flux as follows: The power of these fluxes to remove an oxide layer over the metal surface is small, and therefore, complete bonding cannot be attained. Also, the bonded strength turns out to be different for different electronic parts.

Under these circumstances, it has recently been attempted to place a metal member to be bonded in a container together with a drying agent, or to replace the air in the container with inert gas. However, it is not easy to completely replace the air in the container with inert gas such as nitrogen and argon gas. Even if the air replacement is completely done, oxygen and moisture penetrate through the packing material, which composes the container, into the container, and the oxygen content and the humidity within the container increase, causing the metal surface to be oxidized. It is also difficult to remove oxygen within the container by using a drying agent.

Accordingly, a flux has to be used in order to remove an oxide layer which is formed over the surface of the metal preserved in the container. However, since a usable flux is one containing a small amount of halogen activators or no halogen activators, the problem still remains that an oxide layer over the metal surface cannot be sufficiently removed at the end, and the bonding of the member including metal by a filler material is insufficient.

SUMMARY OF THE INVENTION

One object of the present invention is to provide a method for bonding a member having metal with another member having metal or another metal material, without using flax, which allows for the definite bonding of the member having metal by a filler material.

Another object of the present invention is to provide a method for bonding an electronic part on a substrate by a filler material, without using a flux, which results in superior electrical characteristics of the electronic parts after bonding.

The present invention is characterized by the method in which the member having metal material is preserved in a hermetically sealed manner in a container with low gas permeability together with a rust-proof agent packet which absorbs oxygen, moisture and acidic gas. The present invention also prevents the formation of an oxide layer on the metal surface of the metal member by preserving the member including metal material in an atmosphere where no oxygen, moisture and corrosive substances exist, and where reductive gas co-exists, and enables the bonding of the member having metal, without using a flux.

Under the present invention, the wettability of the metal surface against a filler material is improved, and when bonding the member having metal, the use of a flux may be omitted.

Now, the filler material used in the present invention comprise a metal to be used for the purpose of bonding two metals, which bonding comprises at least one of soldering and brazing, and filler material has a melting point lower than the melting points of these metals. Specifically, the filler material comprises a solder or a brazing filler metal, or a combination thereof. As used herein, if the melting point is lower than 450° C. (preferably 130° to 450 ° C.), the filler material is considered to be the solder metal, and if the melting point is higher than 450° C. (preferably 450 ° to 1300° C.), it is considered to be the brazing filler material. The brazing filler material may comprise at least one of Cu alloy, Ni alloy, Ag alloy and Pd alloy.

The member having metal may be any and all kinds of parts having metal materials, and also be simple metal substances.

As for metals to be bonded, any metals which can be bonded by a filler material may be used, such as copper, silver, iron, zinc, lead, tin, nickel and gold. An alloy containing two or more kinds of these metals may also be used. When oxygen exists, an oxide layer is formed on the surface of these metals, and it is assumed that the formation of the oxide layer may be promoted by the existence of moisture and corrosive substances such as sulfur compounds and halogen compounds. The present invention prevents the formation of the oxide layer and enables the bonding by using a filler material, without using a flux.

A preferable example of the member having metal of this invention is an electronic part. The electronic part is essentially composed of metallic and plastic materials, and the metal portions are bonded with other members or metal materials by soldering or brazing. Examples of the electronic parts are basic elements and wiring substrates.

As basic elements, electronic parts such as cables, resistors, capacitors, relays, semiconductor devices, waveguides, and combinations thereof may be listed. These electronic parts are bonded to the metal portions of wiring substrates by using a filler material, thereby mounting the electronic parts on the wiring substrates. A wiring substrate is made by forming metal foil, such as copper foil, into a pattern and laminating such pattern on a plastic layer. In some cases, this wiring substrate is further gilded with silver, tin or solder, or is coated with a preflux of which the main components are rosin, polyester resin and the like.

The present invention may also be applied to solder metals or brazing filler metals themselves. These filler materials may be in a powder or cream form. The grain size of the powdery metal is 10 to 70 μm, or preferably 10 to 50 μm.

The packet containing a rust-proof agent comprises an oxygen absorbing agent which easily absorbs oxygen in a dry condition, and preferably an oxygen absorbing agent which is capable of absorbing not only oxygen, but also moisture and corrosive substances such as sulfur compounds and halogen compounds.

The packet containing the rust-proof agent is placed in a preservation container having low gas permeability or preferably having gas impermeability, together with the member having metal in a hermetically sealed manner, and then the rust-proof agent absorbs oxygen, moisture and corrosive substances within the preservation container to make the oxygen content 0.5% or less, or preferably 0.1% or less, in order to maintain an atmosphere in the hermetically sealed condition in a state where no oxygen actually exists, which inhibits the oxidation of the metal. Especially, the oxidation of the metal may be inhibited by removing moisture and corrosive substances such as sulfur compounds and halogen compounds in the container, which are known to promote the oxidation of metals, within 5 hours, and by removing these substances which permeate into the inside of the container.

If the speed of oxygen absorption by the rust-proof agent packet is slow, the metal sometimes becomes oxidized before a state of no oxygen in the container is achieved. On the other hand, if the speed of oxygen absorption is too fast, while the rust-proof agent is being used, the loss of its oxygen absorbing capacity by treating in the air becomes great and the generation of heat becomes substantial due to the exposure to atmospheric air. Therefore, as for the oxygen absorption speed of the rust-proof agent packet, it is desirable to achieve a period of time necessary for the rust-proof agent to absorb oxygen in the hermetically sealed condition until it actually achieves a state of no oxygen, to be within a range from 2 hours to 5 days, or preferably 3 hours to 3 days, or more preferably 5 hours to 2 days.

The above described rust-proof composition contains an unsaturated fatty acid compound, or a combination of an unsaturated fatty acid compound and a chain hydrocarbon compound having unsaturated groups, such as unsaturated aliphatic hydrocarbon as the main component for the reaction of oxygen absorption.

It is preferable that the rust-proof composition contains at least one of an oxidation promoting substance, a basic substance and an absorption substance, other than the above-mentioned main component, that is, an unsaturated fatty acid compound, or a combination of an unsaturated fatty acid compound and a chain hydrocarbon compound.

The unsaturated fatty acid compound used herein is at least one of an unsaturated fatty acid having 10 or more carbons, an ester of such unsaturated fatty acid, and a salt of such unsaturated fatty acid. Examples of the unsaturated fatty acid compounds are: unsaturated fatty acid such as oleic acid, linoleic acid, linolenic acid, arachidonic acid, parinaric acid, dimer acid, lithinolein acid, ricinolic acid; esters of these unsaturated fatty acid; fats and oils containing these esters; and metal salts of the above unsaturated fatty acid.

The chain hydrocarbon compound having unsaturated groups is a chain hydrocarbon, which has 10 or more carbons and has one or more unsaturated groups such as double bonding between the carbon atoms, or may be an oligomer or polymer or derivative of such a chain hydrocarbon. This derivative has a substituent such as hydroxyl group and formyl group. Examples of the chain hydrocarbon having unsaturated groups are oligomers or polymers of butadiene, isoprene, or 1,3-pentadiene, and squalene.

A preferable embodiment of the main component of the rust-proof composition is a transition metal salt of unsaturated fatty acid, or a mixture of the transition metal salt of unsaturated fatty acid and an unsaturated fatty acid, or a mixture of such compounds and hydrocarbon polymers having unsaturated groups. However, contamination of the main component by impurities is acceptable as long as the objectives of the present invention can be attained.

An oxidation promoting substance serves as a catalyst in the reaction of the main component to absorb oxygen. Examples of the oxidation promoting substance are compounds of transition metals such as iron, cobalt, chrome, copper and nickel. Examples of the transition metals are: inorganic acid salts such as sulfuric acid salt, hydrochloric acid salt and nitric acid salt; organic acid salts such as fatty acid salt and unsaturated fatty acid salt; and amine complex of transition metals. It is preferable to mix the oxidation promoting substance with the main component equally. The oxidation promoting substance described herein may be in the form of a metal salt of the unsaturated fatty acid used as the main component.

A basic substance absorbs or neutralizes corrosive substances such as sulfur compounds and halogen compounds, which diffuse through the preservation container, and acid (acidic) substances which are generated by the oxygen absorption reaction of the above-described main component. There is no special limitation as to the basic substance to be used as long as the above-described purpose is achieved. As preferable basic substances, at least one of oxides, hydroxides, carbonates and organic acid salts of alkali metal or alkaline earth metal, and organic amines may be used.

An absorption substance absorbs moisture, and more preferably absorbs even acid substances. The absorption substance serves as a carrier which holds the main component, extends the area contacting oxygen, and increases the speed of oxygen absorption. As the absorption substance, at least one of paper made of natural pulp, silica gel, activated carbon, zeolite, diatomaceous earth, and activated clay should be used.

A rust-proof composition contains a main component, an oxidation promoting substance, a basic substance and an absorption agent as described above. The proportion of the respective components with respect to 100 parts by weight of the main component is preferably within a range of 0.01 to 10 parts by weight of the oxidation promoting substance, 1 to 1000 parts by weight of the basic substance, and 10 to 1000 parts by weight of the absorption substance.

Liquid substances in the above rust-proof composition are held by and combined with the absorption substance. There is no limitation as to the shape of the rust-proof composition, and the shape may be adjusted into a grain, tablet or sheet as appropriate.

The above rust-proof composition is provided as a packet which is wrapped with a packing material having gas permeability, that is, having an oxygen permeation speed of 1000 ml/$m^2$.atm.Day or more. There is no limitation as to the material and construction of the gas-permeable packing material and the packet. For example, the packing material may be composed of a base material such as a sheet of paper, non-woven cloth, porous plastic film or sheet, or a laminated layer of two or more of these materials, and the peripheries of the packing material are sealed by heat.

The packet containing the rust-proof composition which is wrapped with the packing material may be double wrapped with a gas-permeable packing material, of which the oxygen permeability is 1000 ml/$m^2$.atm.Day or more and the water vapor permeability is 1 g/$m^2$.Day or more, and with a gas-permeable packing material which has 50% or more of the collection efficiency of dust in the size of 0.3 μm or more when air is permeated through said material.

There is no limitation as to the shape of the above-described packet, but a small bag shape, a sheet shape or a blister package may be listed as examples of the shape.

A gas-impermeable container used for the preservation of an electronic material in the present invention is less permeable to air, or preferably is impermeable to air. For example, a bag, case, can or the like made of gas-impermeable plastic or metal may be used. It is preferable for the gas-impermeable container to have a speed of oxygen permeation of 5 ml/Day or less, or preferably 1 ml/Day or less, per volume of 100 ml, and the speed of moisture permeation of 5 g/Day or less, or preferably 1 g/Day or less, per volume 100 ml.

Examples of the materials composing the container of the present invention are: a case made of synthetic resin such as polyethylene, polypropylene, nylon, polyester, vinyl chloride, polystyrene, and polycarbonate; or a bag having a laminated construction of films or sheets of vinyl chloride, vinylidene chloride, nylon, polyethylene, polypropylene, polyester and the like. When a plastic film or sheet is selected, aluminum, silicon dioxide, selenium dioxide or the like is deposited on the surface of the plastic film or sheet in order to enhance the resistance to gas permeation. Moreover, a metal foil such as an aluminum foil is sometimes used by laminating it over the plastic film.

Furthermore, as the gas-impermeable container, there is a metal can made of iron, tin plate, stainless or aluminum, and a plastic packing material may be used for the metal can.

It is desirable to treat the materials used for the gas-impermeable container to eliminate static electrical charges.

According to the present invention, it is possible to perform the bonding by heating and melting a filler material such as a solder metal and a brazing filler metal, without applying a flux over the metal surface. The solder metal to be used may be a normal solder alloy, and preferably is an alloy containing tin, and more preferably is an alloy of tin and lead with the ratio of tin contained being 5% to 95%.

Solder cream made by changing the powder of the solder component into a paste form may be used. In this case, the solder cream is applied on a wiring substrate, and is heated by infrared rays up to a temperature of 200° C. to 300 ° C. The method of heating for bonding includes infrared radiation, laser beam radiation, application of heated gas, compression of heated metal plates, application of ultrasonic wave or combinations thereof.

The present invention is further characterized by the method in which the rust-proof composition and an organic compound, which has at least one of carboxyl groups and aldehyde groups and which has 4 to 10 carbons, are placed in a container in a hermetically sealed condition, and the bonding of the metal material preserved in the container is conducted by using a filler material.

By previously making the organic compound having carboxyl groups or aldehyde groups and having 4 to 10 carbons co-exist with the member including metal, compared to the case in which only the rust-proof composition co-exists with the member including metal, the organic compound acts to facilitate and ensure the bonding of metal. The organic compound transpires by being previously caused to co-exist with the metal material to be bonded, and forms a thin film over the surface of the metal material. The inventors of this invention believe that this thin film may improve the quality of the metal surface and, therefore, facilitate the bonding. It is thought that this mechanism works to make the surface of the base metal wettable against the melted filler material and enhances the bonding properties of the base metal to the other metal, as the thin film of the organic compound creates a reductive atmosphere due to heat generated while bonding, or as the oxide layer is removed.

When the number of carbons contained in the organic compound having carboxyl groups or aldehyde groups exceeds 10, a necessary concentration sometimes may not be attained and sufficient effects may not be obtained to prevent oxidation on the metal surface. Therefore, the number of carbons in the organic compound should preferably be 10 or less. When the number of carbons in the compound is 3 or less, the concentration within the hermetically sealed container becomes high, and the metal surface sometimes suffers discoloration. Accordingly, the organic compound having carboxyl groups or aldehyde groups should have 10 or less carbons, and preferably it should have 4 to 10 carbons. For example, an organic compound with little volatility, such as perfume, may preferably be used.

As the organic compound having at least one of the carboxyl groups and aldehyde groups and having 4 to 10 carbons, at least one of the following aliphatic or aromatic compounds may be used. Carboxylic acid and the corresponding acid anhydrides may be used.

Examples of aliphatic carboxylic acids are: butyric acid (C4), fumaric acid (C4), maleic acid (C4), itaconic acid (C5), valeric acid (C5), caproic acid (C6), enanthic acid (C7), caprylic acid (C8), pelargonic acid (C9), and capric acid (C10).

Examples of aromatic carboxylic acids are: benzoic acid (C7), salicylic acid (C7), vanillic acid (C8), anisic acid (C8), phenylacetic acid (C8), phthalic acid (C8), cinnamic acid (C9), trimellitic acid (C9), vetattic acid (C9), and pyromellitic acid (C10).

Examples of aliphatics aldehyde are: butyraldehyde (C4), crotonaldehyde (C4), valeraldehyde (C5), hexylaldehyde (C6), heptylaldehyde (C7), octylaldehyde (C8), nonylaldehyde (C9), decylaldehyde (C10), citral (C10), citronellal (C10), dihydroxycitronellal (C10), perilla aldehyde (C10), and cyclocitral (C10).

Alicyclic compounds are also included in the above aliphatic compounds.

Examples of aromatic aldehydes are: benzaldehyde (C7), salicylaldehyde (C7), anisaldehyde (C8), vanillin (C8), homoanisaldehyde (C9), cinnamaldehyde (C9), cuminaldehyde (C10), methylhomovanillin (C10), and methoxycinnnamic aldehyde (c10).

There are no special limitations as to the form in which the organic compound which has at least one of the carboxyl groups and aldehyde groups and has 4 to 10 carbons, co-exists with the metal material and the rust-proof agent packet. For example, it is possible to select a method of retaining the organic compound in the container, separately from the rust-proof agent packet, and causing the organic compound to volatilize in the container. Alternatively, it is also possible to mix the organic compound consisting of an aldehyde group with the rust-proof composition and to make them co-exist in the same packet. The organic compound should not be mixed with the rust-proof composition, if they react with each other. It is also possible to store the organic compound containing carboxyl groups or aldehyde groups in another packet, and to cause them to volatilize toward the container preserving the member including metal materials. The same materials may be used for a packet in which the organic compound is contained as that used for a packet in which the rust-proof composition is contained.

The organic compound is normally held by a porous substance. Examples of the porous substance are: paper made of natural pulp, silica gel, activated carbon, zeolite, and activated clay. The proportion of the porous substance to be mixed with 100 parts by weight of the organic compound is 0.1 to 500 parts by weight. When the organic compound is caused to co-exist with the rust-proof composition in the packet, the organic compound may be held by the aforementioned absorption substance.

The content proportion of the organic compound with respect to 100 parts by weight of the main component is 0.005 to 10 parts by weight, more preferably 0.05 to 5 parts by weight.

When the organic compound is mixed with the rust-proof composition, these are both wrapped with the aforementioned gas-permeable packing material.

The following process is within the scope of the present invention: Heating the gas-impermeable container which holds the metal material together with the rust-proof agent packet and the organic compound having at least one of the carboxyl groups and aldehyde groups, before transportation or preservation, in order to cause the organic compound to volatilize within the hermetically sealed container.

As described above, after the metal material which is preserved in a hermetically sealed condition in the gas-impermeable container together with the rust-proof agent packet, or further with the organic compound, is taken out of the container, it is heated without being exposed to air as much as possible, and its metal portion is bonded to the other member, that is, a member including metal or a metal itself, by using a filler material.

There are two kinds of bonding methods, that is, soldering and brazing. However, soldering is preferable.

As for the treatment for bonding, it is desirable that the member having metal is heated up to a temperature higher than the melting point of the filler material in an atmosphere where air is excluded such as an inert gas atmosphere, reductive atmosphere, or vacuum atmosphere.

BRIEF EXPLANATION OF THE DRAWINGS

FIG. 3 is a graph showing changes in the hydrogen sulfide content of the bag containing the rust-proof agent packet corresponding to that of FIG. 1 (25 ° C.) with the passage of time in a hermetically sealed condition.

DESCRIPTION OF THE PREFERRED EMBODIMENTS

Preferable examples of the present invention will be described hereinafter. However, the present invention is not limited to the following examples.

EXAMPLE 1

Preparation of Test Pieces:

Copper, silver and solder metal were gilded respectively in a thickness of 5 μm on a copper plate (size: 1.27 mm width ×60 mm length×0.5 mm thickness). The gilded copper plate was cleaned in water, dipped in ethanol at a temperature of 23° C., and dried in blast at a temperature of 24° C. to prepare three kinds of test pieces plated with copper, silver and solder.

Manufacture of Rust-Proof Agent Packet:

0.2 g of cobalt naphthenate was dissolved in 1.0 g of a mixture which was prepared from 0.5 g of polybutadiene (viscosity: 200 poise) and 0.5 g of fatty acid of soy bean oil. The solution obtained was impregnated in 5 g of granular diatomaceous earth, and then the diatomaceous earth was coated with 0.1 g of slaked lime to produce a granular composition. This granular composition (total weight: 6.3 g) and 2.5 g of granular calcium oxide were wrapped with a gas-permeable packing material (70×70 mm), which was formed by laminating paper and a porous polyethylene film, with the polyethylene film inside. Then, the peripheries of the packing material were sealed by heat to manufacture a packet containing the rust-proof composition.

Gas Absorptivity of Rust-Proof Agent Packet:

One piece of the rust-proof agent packet was placed in a bag sealed on three sides (size: 220×300 mm; surface area: 0.11 m$^2$; oxygen permeation speed: 0.044 ml/24 Hr). This bag was made of a silicon dioxide deposited combined film (oxygen permeation speed: 0.5 ml/m$^2$.24 Hr.Atm; water vapor permeability: 0.1 g/m$^2$.24 Hr). The bag was filled with 500 ml of air (humidity: 65 % RH; content of hydrogen sulfide: 7 ppm) and its opened portion was hermetically sealed by heat.

Figure 1:
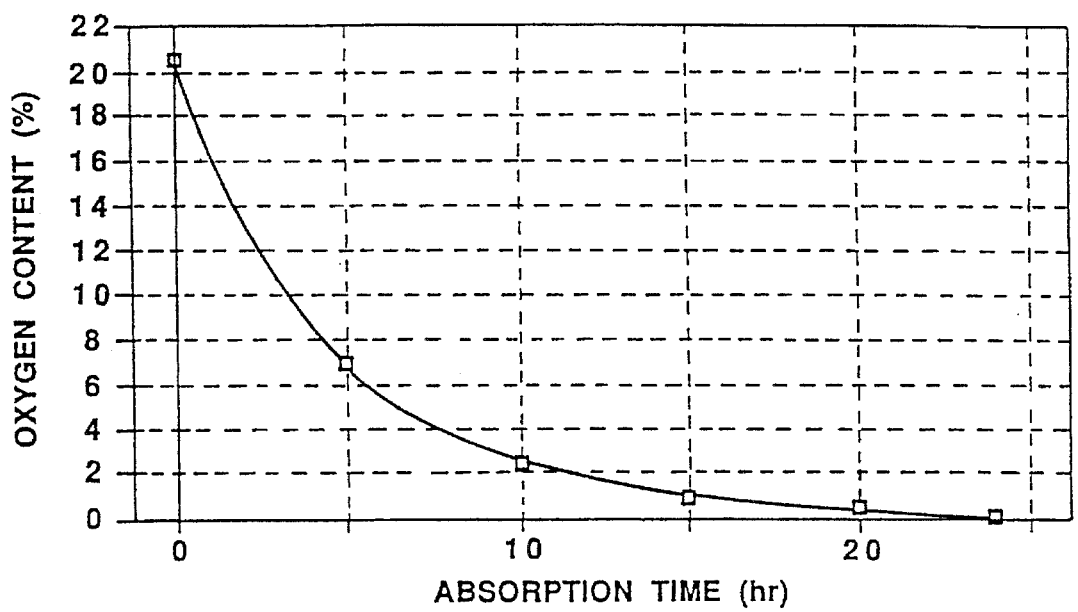
FIG. 1 is a graph showing the changes in the oxygen content in a bag containing a rust-proof agent packet of the present invention (25° C.) with the passage of time in a hermetically sealed condition.
Figure 2:
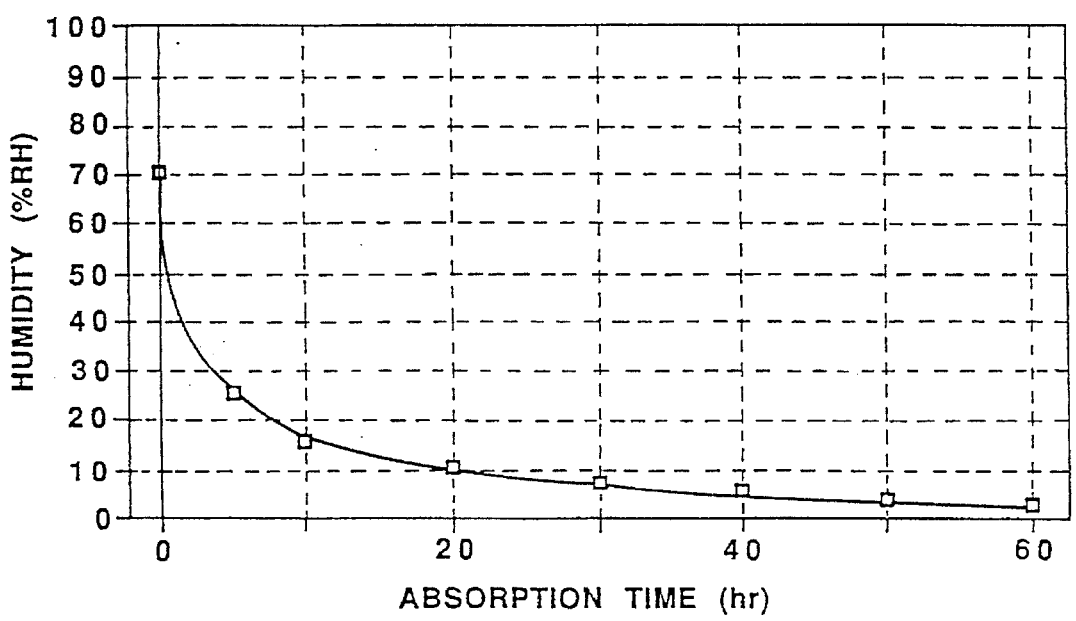
FIG. 2 is a graph showing changes in the humidity of the bag containing the rust-proof agent packet corresponding to that of FIG. 1 (25° C.) with the passage of time in a hermetically sealed condition.

FIGS. 1, 2 and 3 respectively show changes with the passage of time in the oxygen content, humidity and hydrogen sulfide content when this bag with the rust-proof agent packet placed inside in a hermetically sealed manner was left alone at a temperature of 25° C.

Preservation of Test Pieces:

Each piece of the above-described three kinds of test pieces was placed in a hermetically sealed manner with 500 ml of air in a bag of the silicon dioxide deposited combined film sealed on three sides (size: 220×300 mm) which is the same bag as described above. This bag with the test piece and the rust-proof agent packet placed inside in a hermetically sealed manner was retained at a temperature of 25° C. for 1 day, and then was preserved under an atmosphere of 95% RH or more at a temperature of 40° C.

Table 1 shows the oxygen content and humidity within the sealed bag under preservation and Table 2 shows the concentration of the reductive gas detected by gas chromatography. Table 3 shows the state of discoloration of the test pieces under preservation.

TABLE 1

Changes with the Passage of Time in the Oxygen Content and Humidity in the Preservation Condition

| | | Oxygen Content | | | Humidity (RH %) | | |
|---|---|---|---|---|---|---|---|
| | Material | 1 wk. 3) | 2 wks. 4) | 1 mo. 5) | 1 wk. | 2 wks. | 1 mo. |
| EX 1 1) | copper | 0.02 | 0.02 | 0.01 | 1 | 2 | 4 |
| | silver | 0.01 | 0.02 | 0.01 | 0 | 1 | 3 |
| | solder | 0.01 | 0.01 | 0.02 | 1 | 1 | 3 |
| CE 1 2) | copper | 20.21 | 20.46 | 20.51 | 5 | 15 | 37 |
| | silver | 20.58 | 20.76 | 20.77 | 7 | 21 | 41 |
| | solder | 20.51 | 20.75 | 20.74 | 6 | 18 | 39 |
| CE 2 | copper | 1.21 | 1.74 | 2.32 | 28 | 54 | 81 |
| | silver | 1.89 | 2.44 | 3.42 | 31 | 57 | 88 |
| | solder | 1.59 | 2.12 | 3.18 | 32 | 57 | 8 |

Note 1) EX: EXAMPLE
Note 2) CE: COMPARATIVE EXAMPLE
Note 3) wk: week
Note 4) wks: weeks
Note 5) mo: month

TABLE 2

Changes with the Passage of Time in the Concentration of Reductive Gas in the Preservation Condition

| Material | CO (%) | | H$_2$ (%) | | Butyraldehyde (%) |
|---|---|---|---|---|---|
| | 1 wk. | 1 mo. | 1 wk. | 1 mo. | 1 mo. |
| EX 1 copper | 0.32 | 0.41 | 0.24 | 0.25 | 5 |
| silver | 0.31 | 0.38 | 0.25 | 0.27 | 4 |
| solder | 0.34 | 0.39 | 0.22 | 0.24 | 5 |

TABLE 3

State of Discoloration of Preserved Test Pieces

| | | State of Discoloration | | | |
|---|---|---|---|---|---|
| | Material | Before Preservation | 1 week | 2 weeks | 1 month |
| EX 1 | copper | − | − | − | − |
| | silver | − | − | − | − |
| | solder | − | − | − | − |
| CE 1 | copper | − | − | + | ++ |
| | silver | − | − | + | + |
| | solder | − | − | + | ++ |
| CE 2 | copper | − | + | ++ | ++ |
| | silver | − | + | + | ++ |
| | solder | − | + | ++ | +++ |

Note: State of discoloration
−: no discoloration
+: distinguishable slight discoloration
++: substantial discoloration
+++: overall discoloration Solder Wettability Test:

A test piece was preserved in a hermetically sealed manner in a bag together with a rust-proof agent packet for one month. Immediately after taking the test piece out of the bag, the wettability against solder over the surface of the test piece was examined in a nitrogen atmosphere and under the following conditions through observation of the appearances.

The solder bonding was performed on this test piece under conditions subject to MIL-STD-883D method 2022.2 without using flux. The bonding properties of solder were evaluated by Zero-Cross time.
Measurement Device: SAT-5000 Type made by Rhesca Co., Ltd. (Japan)
Measuring Conditions: The same as in Table 4.

TABLE 4

Conditions of Solder Wettability Test

| Items | Dipping Conditions |
|---|---|
| Solder | H63A (Sn 63%) |
| Temperature of Solder Bath | 245° C. |
| Dipping Time | 5 seconds |
| Dipping Depth | 2 mm |
| Dipping Speed | 25 mm/sec |

TABLE 5

Solder Wettability of Test Piece Before and After One-Month Preservation

| Gilding Material | Before Preservation | EX 1 | CE 1 | CE 2 |
|---|---|---|---|---|
| Copper | O | O | X | X |
| Silver | O | O | X | X |
| Solder | O | O | X | X |

O: Solder stays uniformly and adhesively over the surface of the test piece.
X: Most of the solder does not stay over the surface of the test piece, and the solder adhering to the surface is in a bubble form.

The thickness of an oxide layer over the surface of the test piece which was gilded with copper was measured by an electrolytic reduction method. The results are shown in Table 6.

Analysis Method of Oxide Content

Measurement Principle: Electrolytic Reduction Method

Measurement Device: BOARD-O-TESTER made by HARIMA CHEMICALS, Ltd.

Measurement Unit: The quantity of electricity required for the reduction of copper oxide to metal copper at the electric potential of −800 mV was converted into the thickness of $Cu_2O$ in the following expression, and the oxide content was obtained.

$\delta = 71.5 \cdot i_p \cdot t / 96500.6$ $\delta$: thickness of oxide (nm)

$i_p$: current density (coulomb/second $cm^2$)

t: time (second)

test piece: 10×60×0.5 mm

TABLE 6

Thickness of Oxide Layer of the Test Piece Gilded with Copper Before and After One-Month Preservation

| | Before Preservation | Ex. 1 | CE. 1 | CE. 2 |
|---|---|---|---|---|
| Thickness of Oxide Layer (nm) | 49,55 | 49,55 | 496,525 | 401,547 |

Note) Thickness of oxide layer: $Cu_2O$ conversion

COMPARATIVE EXAMPLE 1

Three kinds of test pieces gilded with copper, silver and solder were preserved in the same manner as in EXAMPLE 1 except that the content of the rust-proof agent packet of EXAMPLE 1 was changed to 3 g of silica gel (Type A) in order to make a dry agent packet using the same procedure as in the EXAMPLE 1.

COMPARATIVE EXAMPLE 2

Three kinds of test pieces, respectively gilded with copper, silver or solder, were placed in preservation bags of silicon dioxide deposited combined film, as used in EXAMPLE 1, together with 500 ml of nitrogen gas in a hermetically sealed manner, without using the rust-proof agent packet. In this case, since the air within the preservation bags was not completely replaced with nitrogen gas, the oxygen content within the bags was 0.7% when the bags were sealed. The preservation bags containing these test pieces in a hermetically sealed manner were preserved in the same method as in EXAMPLE 1.

The test pieces of COMPARATIVE EXAMPLES 1 and 2 were taken out of the bags, and the bonding properties with the solder were measured as in EXAMPLE 1. With regard to the test pieces gilded with copper, the thickness of the oxide layer over the surface of copper was measured by the electrolytic reduction method.

The results of COMPARATIVE EXAMPLES 1 and 2 are shown respectively in Tables 1, 3, 5 and 6 in comparison with the results of EXAMPLE 1. However, no reductive gas was detected in the preservation condition used in COMPARATIVE EXAMPLES 1 and 2.

The bonding properties with solder were good as shown in Table 5.

The reasons for good bonding properties with solder will be considered hereafter. As it is obvious in Tables 1 and 2, by accommodating the member including metal in a hermetically sealed condition together with the rust-proof agent packet in a gas-impermeable container, oxygen and moisture in the preservation container are absorbed by the rust-proof agent, and reductive substances are generated due to an oxygen absorption reaction of the main component of the rust-proof agent. Accordingly, we may consider that the preservation of the metal member under a reductive atmosphere where no oxygen, moisture or corrosive substances actually exist, and where reductive gas co-exists with the metal member, prevents the formation of an oxide layer on the metal surface which is to be bonded by solder, and that reduction of the oxide enables the maintenance of good bonding properties with solder. The reduction occurring in the oxide over the metal surface is confirmed by, for example, a change in the charge of copper oxide from copper(II) to copper(I) over the metal copper surface of the test pieces gilded with copper.

EXAMPLE 2

Preparation of Test Pieces:

Test pieces were prepared in the same manner as in EXAMPLE 1.

Manufacture of Rust-Proof Agent Packet and Composition:

4 parts by weight of cobalt naphthenate was dissolved in a mixture of 10 parts by weight of polybutadiene (viscosity: 200 poise) and 10 parts by weight of fatty acid of soy bean oil. The solution obtained was impregnated in 100 parts by weight of granular diatomaceous earth, and then the diatomaceous earth was coated with 2 parts by weight of slaked lime to prepare a granular rust-proof composition (A). This rust-proof composition (A) is the same as the one obtained in EXAMPLE 1.

Next, 50 parts by weight of granular diatomaceous earth was mixed with 1 part by weight of each of the following carboxylic acids to obtain granular compositions (B): fumaric acid (No. 1), caproic acid (No. 2), enanthic acid (No. 3), caprylic acid (No. 4), capric acid (No. 5), benzoic acid (No. 6), salicylic acid (No. 7), phthalic acid (No. 8), and veratric acid (No. 9).

6.3 g of the rust-proof composition (A) and 5.19 of the granular compositions (B), each containing one of the above carboxylic acids, were respectively wrapped with a gas-permeable bag (a packing material made by laminating paper and porous polyethylene film, size: 70×70 mm), thereby preparing two kinds of packets: the packet of the rust-proof composition (A) and the packets of the compositions (B).

Instead of carboxylic group, 1 part by weight of each of the following organic compounds having aldehyde groups was mixed with 10 parts by weight of granular diatomaceous earth to obtain granular compositions (B): butyraldehyde (No. 10), valeraldehyde (No. 11), hexylaldehyde (No. 12), octylaldehyde (No. 13), nonylaldehyde (No. 14), citral (No. 15), benzaldehyde (No. 16), vanillin (No. 17), and cuminaldehyde (No. 18).

6.3 g of the rust-proof composition (A) was mixed with 1.1 g of each of the granular compositions (B), containing one of the above aldehydes. The obtained mixture and 2.5 g of granular calcium oxide were wrapped in a gas-permeable bag (a packing material made by laminating paper and porous polyethylene film, size: 70×70 mm), thereby preparing one packet for each composition (B), which contains both the rust-proof composition (A) and one of the compositions (B).

Preservation of Test Pieces:

One of the above-described test pieces which was gilded with copper was placed in a bag sealed on three sides (size: 220×300 mm) together with the packets each containing the rust-proof composition (A) or one of the compositions (B), or the packet containing both the rust-proof composition (A) and one of the compositions (B), and also with 500 ml of air. This bag was made of a silicon dioxide deposited combined film (oxygen permeation speed: 0.5 ml/m$^2$.24 Hr.Atm; water vapor permeability: 0.1 g/m$^2$.24 Hr). For the compounds Nos. 1–9, two bags of packets were used, in which the rust-proof composition (A) and the compositions (B) were packed separately. For the compounds Nos. 10–18, one bag of packet was used, in which the rust-proof composition (A) and one of the compositions (B) were put in the bag together.

The bags with the test pieces placed in a hermetically sealed condition were retained at a temperature of 25° C. for 1 day, and then were preserved under the atmosphere of RH 95% or more at a temperature of 40° C. for 14 days.

Metal Bonding Properties Test:

The test pieces which were preserved in a hermetically sealed condition in the bags for 14 days, as described above. Immediately after taking the test pieces out of the bags, the test was performed to determine the bonding properties of the test pieces with solder, and the bonding properties of metal were evaluated.

The solder bonding properties test of the test pieces was performed in an nitrogen atmosphere by a meniscus graph method.

The results (zero-cross time) of the solder bonding properties test of the test pieces after 14-day preservation are shown in Table 7.

When the test pieces are dipped in the solder bath, buoyancy acts on the dipped test pieces at first, and then the melted solder metal piles up above the test pieces because of the surface tension of the solder metal, and the test pieces lose buoyancy. The zero-cross time is the period of time that lapses between the beginning of the dipping and the time when the buoyancy is lost. The zero-cross time is measured automatically. A reciprocal number of the zero-cross time indicates the piling-up speed of the melting solder metal. A smaller value of the zero-cross time indicates better wetting of the metal against the melted solder, and therefore indicates better bonding properties of the metal with solder.

COMPARATIVE EXAMPLE 3

The content of the packets of EXAMPLE 2 was changed to 3 g of silica gel (Type A) in order to make a dry agent packet using the same procedure as in EXAMPLE 2. The dry agent packet and the test piece gilded with copper were placed together with 500 ml of air in a hermetically sealed condition in a bag made of a silicon dioxide deposited combined film which was sealed on three sides. The bag was first retained at a temperature of 25° C. for 1 day, and then was preserved under an atmosphere of 95RH % or more at a temperature of 40° C. for 14 days.

COMPARATIVE EXAMPLE 4

The test piece gilded with copper was placed together with 500 ml of nitrogen gas in a preservation bag made of a silicon dioxide deposited combined film, as the same as in EXAMPLE 2, in a hermetically sealed condition. Since the air within the preservation bag was not completely replaced with nitrogen gas, the oxygen content within the bag was 0.7% when it was sealed. The preservation bag containing the test piece in a hermetically sealed condition was preserved for 14 days in the same manner as in EXAMPLE 2.

EXAMPLE 3

The test piece gilded with copper was preserved in the same manner as in EXAMPLE 2, except that the packet containing 6.3 g of the rust-proof composition (A) was used.

The preserved test pieces of COMPARATIVE EXAMPLES 3 and 4, and EXAMPLE 3 were taken out of the bags, and then the solder bonding properties test was performed in the same manner as in EXAMPLE 2 and the results were compared. The results are shown in Table 7.

TABLE 7

Results of Solder Bonding Properties Test of the Test Pieces after 14-Day Preservation

| | Organic Compounds | Zero-Cross Time |
|---|---|---|
| No. 1 | fumaric acid | 0.2 |
| No. 2 | caproic acid | 0.2 |
| No. 3 | enanthic acid | 0.3 |
| No. 4 | caprylic acid | 0.3 |
| No. 5 | capric acid | 0.3 |
| No. 6 | benzoic acid | 0.2 |
| No. 7 | salicylic acid | 0.2 |
| No. 8 | phthalic acid | 0.2 |
| No. 9 | veratric acid | 0.3 |
| No. 10 | butyraldehyde | 0.2 |
| No. 11 | valeraldehyde | 0.2 |
| No. 12 | hexylaldehyde | 0.3 |
| No. 13 | octylaldehyde | 0.3 |
| No. 14 | nonylaldehyde | 0.4 |
| No. 15 | citral | 0.3 |
| No. 16 | benzaldehyde | 0.1 |
| No. 17 | vanillin | 0.3 |
| No. 18 | cuminaldehyde | 0.4 |
| CE 3 | — | >5 |
| CE 4 | — | >5 |
| EX 3 | — | 2.1 |

CE 3: Drying agent only.
CE 4: Replacement with nitrogen gas.
EX 3: Rust-proof composition only.

The bonding properties with solder may be evaluated by zero-cross time. The zero-cross time varies depending on the types of metal, but it is preferable to have a shorter zero-cross time. According to the results shown in Table 7, the test pieces preserved in the method of the present invention may be judged to have very good bonding properties with solder and that it is therefore unnecessary to use a flux. In contrast, as for the test pieces of COMPARATIVE EXAMPLES 3 and 4, and EXAMPLE 3, the zero-cross time was long and the bonding properties with solder were very bad.

According to the present invention, the oxidation of a metal surface may be inhibited and good bonding properties with a filler material may be maintained by placing a member including metal, which is the object of bonding with a filler material such as brazing and soldering, together with a rust-proof agent packet in a gas-impermeable container in a hermetically sealed manner. As a result, good bonding with a filler material can be realized without using a flux.

Further, the oxidation of a metal surface may be inhibited by the action of the rust-proof agent packet which is put in a container in a hermetically sealed condition together with the member including metal. Moreover, the quality of a surface of the parent metal may be improved by the action of an organic compound having carboxyl groups or aldehyde groups which co-exists with the member including metal, so that the metal surface becomes easily wettable against a filler material. Therefore, the member including metal may be bonded to another metal by using a filler material and without using a flux.

If the above-described method is used, especially in the field of electronic materials, it is unnecessary to conduct a cleaning treatment using organic halogen-based solvents or water containing surface active agents after the bonding with a filler material, the cleaning steps may be simplified, and cost reduction may be promoted. Moreover, the present invention will get rid of environmental pollution due to organic halogen-based solvents and will contribute to the preservation of the global environment. Furthermore, the present invention enhances the reliability of the bonding of metals with a filler material, even without using a flux. Deterioration of electric characteristics of the metal due to permeation of the flux will not occur.

In other words, the method of the present invention enables preservation or transportation of the member including metal by retaining it under a reductive atmosphere where no oxygen, moisture or corrosive substances exist and where reductive gas co-exists with the member including metal, by an extremely simple method at a low cost and without losing the bonding properties with a filler material.

What is claimed is:

1. A flux-free method for bonding a member which is at least partially metallic to another member, comprising:
   preserving said at least partially metallic member in a container having a low gas permeability, together with a packet containing a rust-proof composition; and
   bonding said at least partially metal lie member with said other member by using a filler material.

2. A method according to claim 1, wherein said member comprises an electronic part.

3. A method according to claim 1, wherein said member comprises a filler material.

4. A method according to claim 1, wherein oxygen, moisture, and substances which are capable of corroding metals present in said container are absorbed by said rust-proof composition.

5. A method according to claim 4, wherein said rust-proof composition includes an oxygen absorber which achieves an oxygen content inside of said container that is a substantially oxygen free condition.

6. A method according to claim 4, wherein an oxygen content in said container is 0.5% or less.

7. A method according to claim 6, wherein an oxygen content of the inside of said container is changed to said oxygen content in a time period of 2 hours to 5 days.

8. A method according to claim 1, wherein said composition contains an unsaturated fatty acid compound as a main component for oxygen absorption reaction.

9. A method according to claim 8, wherein said composition further contains a chain hydrocarbon compound having unsaturated groups as a main component for oxygen absorption reaction.

10. A method according to claim 1, wherein together with said composition, an organic compound which has 10 or less carbons and which has at least one of carboxyl groups and aldehyde groups, is placed in said container.

11. A method according to claim 9, further comprising a step for heating said container until it reaches a temperature at which said organic compound may be caused to evaporate.

12. A method according to claim 10, wherein said organic compound has 4 to 10 carbons.

13. A method according to claim 8, wherein said composition also contains at least one of an oxidation promoting substance, a basic substance, and an absorption substance.

14. A method according to claim 8, wherein said unsaturated fatty acid compound contains at least one of an unsaturated fatty acid having 10 or more carbons, an ester thereof, and a salt thereof.

15. A method according to claim 8, wherein said chain hydrocarbon compound having unsaturated groups comprises at least one of a hydrocarbon having 10 or more carbons, an oligomer thereof, a polymer thereof, and a derivative thereof.

16. A method according to claim 13, wherein said oxidation promoting substance comprises a transition metal compound.

17. A method according to claim 13, wherein said basic substance comprises at least one member selected from the group consisting of alkali metal oxides, alkali metal hydroxides, alkali metal carbonates, organic acid salts of alkali metal, alkaline earth metal oxides, alkaline earth metal hydroxides, alkaline earth metal carbonates, organic acid salts of alkaline earth metal, and organic amines.

18. A method according to claim 13, wherein said absorption substance comprises at least one of paper made of natural pulp, silica gel, activated carbons, zeolites, activated clay, and diatomaceous earth, which absorbs moisture and holds said main component.

19. A method according to claim 13, wherein said rust-proof composition comprises, with respect to 100 parts by weight of said main component, 0.01–10 parts by weight of said oxidation promoting substance, 1–1000 parts by weight of said basic substance, and 10–1000 parts by weight of said absorption substance.

20. A method according to claim 1, wherein said packet comprises a construction in which said rust-proof composition is wrapped with a gas-permeable material.

21. A method according to claim 20, wherein said packet comprises a construction in which said rust-proof composition is wrapped with a gas-permeable material having an oxygen permeation speed of 1000 ml/m$^2$.atm.Day or more.

22. A method according to claim 1, wherein an oxygen permeation speed of said container is 5 ml/Day or less per 100 ml of said container, and a moisture permeation speed of said container is 5 g/Day or less per 100 ml of said container.

23. A method according to claim 10, wherein said organic compound is contained in said packet.

24. A method according to claim 6, wherein a gas which deoxidizes said metal exists in said container.

25. A method according to claim 1, wherein said filler material has a low melting point and comprises at least one of a solder and a brazing filler metal.

26. A method according to claim 9, wherein said composition also contains at least one substance selected from the group consisting of an oxidation promoting substance, a basic substance, and an absorption substance.

27. A method according to claim 9, wherein said unsaturated fatty acid compound contains at least one compound selected from the group consisting of an unsaturated fatty acid having 10 or more carbons, an ester thereof, and a salt thereof.

28. A method according to claim 9, wherein said chain hydrocarbon compound having unsaturated groups comprises at least one compound selected from the group consisting of a hydrocarbon having 10 or more carbons, an oligomer thereof, a polymer thereof, and a derivative thereof.

29. A method according to claim 10, wherein if said organic compound reacts with said rust-proof composition said organic compound is placed in another packet.

* * * * *

UNITED STATES PATENT AND TRADEMARK OFFICE
CERTIFICATE OF CORRECTION

PATENT NO. : 5,497,937
DATED : March 12, 1996
INVENTOR(S) : Yoshikawa et al.

It is certified that error appears in the above-indentified patent and that said Letters Patent is hereby corrected as shown below:

Column 15, Line 56, change "metal" to --metallic--;

Signed and Sealed this

Sixth Day of August, 1996

Attest:

BRUCE LEHMAN

Attesting Officer     Commissioner of Patents and Trademarks